United States Patent
Yang et al.

(10) Patent No.: US 10,698,741 B2
(45) Date of Patent: Jun. 30, 2020

(54) RESOURCE ALLOCATION METHOD FOR VNF AND APPARATUS

(71) Applicant: HUAWEI TECHNOLOGIES CO., LTD., Shenzhen, Guangdong (CN)

(72) Inventors: Xu Yang, Beijing (CN); Lei Zhu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/146,408

(22) Filed: Sep. 28, 2018

(65) Prior Publication Data
US 2019/0034244 A1    Jan. 31, 2019

Related U.S. Application Data

(63) Continuation of application No. PCT/CN2016/077909, filed on Mar. 30, 2016.

(51) Int. Cl.
*G06F 9/50* (2006.01)
*H04L 12/24* (2006.01)
*H04L 12/46* (2006.01)

(52) U.S. Cl.
CPC ........ *G06F 9/5077* (2013.01); *H04L 12/4641* (2013.01); *H04L 41/08* (2013.01)

(58) Field of Classification Search
CPC . H04L 41/5054; H04L 12/4641; H04L 41/08; H04L 41/0893; G06F 9/5077; G06F 9/505
See application file for complete search history.

(56) References Cited

U.S. PATENT DOCUMENTS

2011/0202640 A1* 8/2011 Pillutla ............... G06F 9/4856
                                                        709/221
2014/0173620 A1    6/2014 Chai
(Continued)

FOREIGN PATENT DOCUMENTS

CN    102567072 A    7/2012
CN    102958166 A    3/2013
(Continued)

OTHER PUBLICATIONS

International Search Report, dated Jun. 29, 2016, in International Application No. PCT/CN2016/077909 (6 pp.).
(Continued)

*Primary Examiner* — Abdulkader M Alriyashi
(74) *Attorney, Agent, or Firm* — Kilpatrick Townsend & Stockton LLP

(57) ABSTRACT

A resource allocating method for a VNF and an apparatus are used to resolve a prior-art problem that when a VNF is established. In the method, a resource allocation device in an NFV architecture selects a corresponding physical machine for a VDU based on a resource configuration information group of the VDU. The resource configuration information group includes a resource scheduling parameter, and the resource scheduling parameter is for indicating a requirement of a VNF on a resource selection and scheduling policy. In this way, when a plurality of factors need to be considered to schedule a resource for the VDU, the resource configuration information group may include resource scheduling parameters that indicate a plurality of factors, and the resource allocation device may schedule a resource for the VDU based on a plurality of factors, thereby improving resource scheduling flexibility in a VNF instantiation process.

11 Claims, 4 Drawing Sheets

(56) References Cited

U.S. PATENT DOCUMENTS

| | | | |
|---|---|---|---|
| 2015/0082308 A1 | 3/2015 | Kiess et al. | |
| 2015/0089496 A1* | 3/2015 | Thankappan | G06F 9/45558 718/1 |
| 2017/0300353 A1 | 10/2017 | Yu et al. | |
| 2018/0181383 A1* | 6/2018 | Jagannath | G06F 9/50 |
| 2018/0181424 A1* | 6/2018 | Gokurakuji | G06F 9/5077 |

FOREIGN PATENT DOCUMENTS

| | | |
|---|---|---|
| CN | 104243301 A | 12/2014 |
| CN | 104518993 A | 4/2015 |
| CN | 104954220 A | 9/2015 |
| CN | 105119736 A | 12/2015 |
| CN | 105429839 A | 3/2016 |
| EP | 2940968 A1 | 11/2015 |
| WO | 2016028927 A1 | 2/2016 |

OTHER PUBLICATIONS

ETSI GS NFV-MAN 001 V1.1.1 (Dec. 2014), "Network Functions Virtualisation (NFV); Management and Orchestration," Group Speci Fication, European Telecommunications Standards Institute (ETSI) (184 pp.).

International Search Report, dated Jun. 29, 2016, in International Application No. PCT/CN2016/077909 (5 pp.).

Written Opinion of the International Searching Authority, dated Jun. 29, 2016, in International Application No. PCT/CN2016/077909 (7 pp.).

\* cited by examiner

RESOURCE ALLOCATION METHOD FOR VNF AND APPARATUS

CROSS-REFERENCE TO RELATED APPLICATIONS

This application is a continuation of International Application No. PCT/CN2016/077909, filed on Mar. 30, 2016. The disclosure of the aforementioned application is hereby incorporated by reference in the entity.

TECHNICAL FIELD

This disclosure relates to the field of communications technologies, and in particular, to a resource allocation method for a VNF and an apparatus.

BACKGROUND

Network Functions Virtualization (NFV) is a technology in which a telecommunications network operator uses commodity hardware such as x86 and a virtualization technology to perform software processing of many functions, and implements some network functions in a standard high-volume server, a switch, and a storage device, so as to reduce high device costs of a network. Various existing network devices, such as a firewall, a router, a broadband remote access server (BRAS), and a Carrier Grade Network Address Translation (CG-NAT) device, may be virtualized by using the NFV technology.

When a control and management device of a virtualized network function (VNF) in a conventional NFV architecture, such as an NFV orchestrator (NFVO) or a VNF manager (VNFM), implements a VNF, deployment information of the VNF needs to be obtained. The deployment information includes the following several parameters: information about at least one virtualization deployment unit (VDU) included in the VNF, a virtual link, a connection port, dependency, a deployment manner, and a relationship between deployment locations of the VDUs (affinity/anti-affinity). The VDU is configured to describe a resource requirement of a virtual machine (VM) or a virtual container.

In an existing process of establishing a VNF, a resource scheduling manner is relatively simple, and a resource cannot be scheduled based on a plurality of factors.

SUMMARY

Embodiments of the present invention provide a resource allocation method for a VNF and an apparatus, so as to resolve a prior-art problem that when a VNF is established, a resource scheduling manner is relatively simple, a resource cannot be scheduled based on a plurality of factors, and resource scheduling flexibility is relatively poor.

Specific technical solutions provided in the embodiments of the present invention are as follows:

According to a first aspect, an embodiment of the present invention provides a resource allocation method for a VNF, and the method includes:

after receiving a VNF instantiation request sent by a network management entity connected to an NFV control device (or an OSS/BSS in an NFV architecture), obtaining, by the NFV control device according to the VNF instantiation request, a resource configuration information group of a VDU included in a VNF; and generating, by the NFV control device, a resource allocation request that includes the resource configuration information group, and sending the resource allocation request to a resource allocation device, where the resource configuration information group includes a resource scheduling parameter, and the resource scheduling parameter is used to indicate a requirement of the VNF on a resource selection and scheduling policy.

According to the foregoing method, after receiving the VNF instantiation request, the NFV control device obtains the resource configuration information group of the VDU, and sends, to the resource allocation device, the resource allocation request that includes the resource configuration information group. The resource configuration information group includes the resource scheduling parameter. The resource scheduling parameter is used to indicate the requirement of the VNF on the resource selection and scheduling policy. In this way, after receiving the resource allocation request of the VDU, the resource allocation device may select a physical machine for the VDU based on the resource scheduling parameter in the resource configuration information group. Therefore, when a plurality of factors need to be considered to schedule a resource for the VDU, the resource configuration information group may include resource scheduling parameters that indicate a plurality of factors, and then the resource allocation device may schedule a resource for the VDU based on the plurality of factors, to select a physical machine for the VDU, thereby improving resource scheduling flexibility in a VNF instantiation process.

In a possible design, the resource scheduling parameter includes a filter-type resource scheduling parameter, and the filter-type resource scheduling parameter is used to select a physical machine that meets the filter-type resource scheduling parameter.

In this way, when a plurality of factors need to be considered to schedule a resource for the VDU, the resource configuration information group includes filter-type resource scheduling parameters that indicate a plurality of factors, and the resource allocation device may schedule a resource for the VDU based on a plurality of factors, and select, for the VDU, a physical machine that meets the filter-type resource scheduling parameters, thereby improving resource scheduling flexibility in a VNF instantiation process.

In a possible design, the resource scheduling parameter includes a filter-type resource scheduling parameter, the resource configuration information group further includes a value range corresponding to the filter-type resource scheduling parameter, and the resource scheduling parameter and the corresponding value range constitute a filter-type configuration condition.

The configuration condition is used to select a physical machine that meets the configuration condition.

In this way, when a plurality of factors need to be considered to schedule a resource for the VDU, the resource configuration information group includes filter-type resource scheduling parameters that indicate a plurality of factors, and the resource allocation device may schedule a resource for the VDU based on a plurality of factors, and select, for the VDU, a physical machine that meets configuration conditions including the filter-type resource scheduling parameters, thereby improving resource scheduling flexibility in a VNF instantiation process.

Optionally, the resource scheduling parameter includes a plurality of filter-type resource scheduling parameters, the resource configuration information group further includes a value range corresponding to each of the plurality of filter-type resource scheduling parameters, and each of the plurality of filter-type resource scheduling parameters and the corresponding value range constitute a filter-type configuration condition.

A plurality of configuration conditions including the plurality of filter-type resource scheduling parameters are used to select a physical machine that meets some or all of the plurality of configuration conditions.

In this way, when a plurality of factors need to be considered to schedule a resource for the VDU, the resource configuration information group includes filter-type resource scheduling parameters that indicate a plurality of factors, and the resource allocation device may schedule a resource for the VDU based on a plurality of factors, and select, for the VDU, a physical machine that meets some or all of a plurality of configuration conditions including the plurality of filter-type resource scheduling parameters, thereby improving resource scheduling flexibility in a VNF instantiation process.

In a possible design, the resource scheduling parameter includes a plurality of weight-type resource scheduling parameters, and the plurality of weight-type resource scheduling parameters are used to determine a weight of a physical machine.

In this way, when a plurality of factors need to be considered to schedule a resource for the VDU, the resource configuration information group includes weight-type resource scheduling parameters that indicate a plurality of factors, and the resource allocation device may determine a weight of a physical machine by using a plurality of weight-type resource scheduling parameters, so as to select a physical machine for the VDU based on the weight of the physical machine. The resource allocation device may schedule a resource for the VDU based on a plurality of factors, thereby improving resource scheduling flexibility in a VNF instantiation process.

In a possible design, the resource scheduling parameter includes a filter-type resource scheduling parameter and a plurality of weight-type resource scheduling parameters, the filter-type resource scheduling parameter is used to select a physical machine that meets the filter-type resource scheduling parameter, and the plurality of weight-type resource scheduling parameters are used to determine a weight of a physical machine.

In this way, when a plurality of factors need to be considered to schedule a resource for the VDU, the resource configuration information group includes a filter-type resource scheduling parameter and weight-type resource scheduling parameters that indicate a plurality of factors, and the resource allocation device may first select, for the VDU by using the filter-type resource scheduling parameter, at least one candidate physical machine that meets the filter-type resource scheduling parameter, and then determine a weight of each physical machine by using the plurality of weight-type resource scheduling parameters, so as to select a physical machine for the VDU based on the weight of the candidate physical machine. The resource allocation device may schedule a resource for the VDU based on a plurality of factors, thereby improving resource scheduling flexibility in a VNF instantiation process.

In a possible design, the resource scheduling parameter includes a filter-type resource scheduling parameter and a plurality of weight-type resource scheduling parameters, the resource configuration information group further includes a value range corresponding to the filter-type resource scheduling parameter, and the resource scheduling parameter and the corresponding value range constitute a filter-type configuration condition. The configuration condition is used to select a physical machine that meets the configuration condition. The plurality of weight-type resource scheduling parameters are used to determine a weight of a physical machine.

In this way, when a plurality of factors need to be considered to schedule a resource for the VDU, the resource configuration information group includes a filter-type resource scheduling parameter and weight-type resource scheduling parameters that indicate a plurality of factors, and the resource allocation device may first select, for the VDU, at least one candidate physical machine that meets configuration conditions including the filter-type resource scheduling parameter, and then determine a weight of each physical machine by using the plurality of weight-type resource scheduling parameters, so as to select a physical machine for the VDU based on the weight of the candidate physical machine. The resource allocation device may schedule a resource for the VDU based on a plurality of factors, thereby improving resource scheduling flexibility in a VNF instantiation process.

In a possible design, the resource scheduling parameter includes a plurality of filter-type resource scheduling parameters and a plurality of weight-type resource scheduling parameters, the resource configuration information group further includes a value range corresponding to each of the plurality of filter-type resource scheduling parameters, and each of the plurality of filter-type resource scheduling parameters and the corresponding value range constitute a filter-type configuration condition; and a plurality of configuration conditions including the plurality of filter-type resource scheduling parameters are used to select a physical machine that meets some or all of the plurality of configuration conditions. The plurality of weight-type resource scheduling parameters are used to determine a weight of a physical machine.

In this way, when a plurality of factors need to be considered to schedule a resource for the VDU, the resource configuration information group includes filter-type resource scheduling parameters and weight-type resource scheduling parameters that indicate a plurality of factors, and the resource allocation device may first select, for the VDU, at least one candidate physical machine that meets some or all of a plurality of configuration conditions including the plurality of filter-type resource scheduling parameters, and then determine a weight of each physical machine by using the plurality of weight-type resource scheduling parameters, so as to select a physical machine for the VDU based on the weight of the candidate physical machine. The resource allocation device may schedule a resource for the VDU based on a plurality of factors, thereby improving resource scheduling flexibility in a VNF instantiation process.

In a possible design, the weight of the physical machine is a sum of products obtained by multiplying values of weight-type resource scheduling parameters of the physical machine by corresponding weight values.

In a possible design, the obtaining, by the NFV control device, the resource configuration information group includes:

determining, by the NFV control device, an identifier of the VNF according to the VNF instantiation request;

determining, by the NFV control device, a corresponding virtualized network function descriptor VNFD based on the identifier of the VNF; and obtaining, by the NFV control device, the resource configuration information group included in the VNFD.

In this way, the NFV control device may accurately obtain the resource configuration information group.

In a possible design, the NFV control device includes an NFV orchestrator or a VNF manager.

According to a second aspect, an embodiment of the present invention further provides another resource allocation method for a VNF, and the method includes:

after receiving a resource allocation request sent by an NFV control device, determining, by a resource allocation device, a resource configuration information group of a VDU included in a VNF, where the resource configuration information group includes a resource scheduling parameter, and the resource scheduling parameter is used to indicate a requirement of the VNF on a resource selection and scheduling policy; and selecting, by the resource allocation device, a physical machine for the VDU based on the resource scheduling parameter.

In a possible design, the resource scheduling parameter includes a filter-type resource scheduling parameter; and the selecting, by the resource allocation device, a physical machine for the VDU based on the resource scheduling parameter includes:

selecting, by the resource allocation device for the VDU based on the filter-type resource scheduling parameter, a physical machine that meets the filter-type resource scheduling parameter.

In this way, when a plurality of factors need to be considered to schedule a resource for the VDU, the resource configuration information group includes filter-type resource scheduling parameters that indicate a plurality of factors, and the resource allocation device may schedule a resource for the VDU based on a plurality of factors, and select, for the VDU, a physical machine that meets the filter-type resource scheduling parameters, thereby improving resource scheduling flexibility in a VNF instantiation process.

In a possible design, the selecting, by the resource allocation device for the VDU based on the filter-type resource scheduling parameter, a physical machine that meets the filter-type resource scheduling parameter in the foregoing design specifically includes:

sorting out, by the resource allocation device in a plurality of physical machines, at least one candidate physical machine that meets the filter-type resource scheduling parameter; and selecting, by the resource allocation device, one of the at least one candidate physical machine as the physical machine of the VDU.

In this way, the resource allocation device may select, for the VDU from a plurality of physical machines, a physical machine that meets the filter-type resource scheduling parameter.

In a possible design, the resource scheduling parameter includes a filter-type resource scheduling parameter, the resource configuration information group further includes a value range corresponding to the filter-type resource scheduling parameter, and the resource scheduling parameter and the corresponding value range constitute a filter-type configuration condition; and the selecting, by the resource allocation device, a physical machine for the VDU based on the resource scheduling parameter includes:

selecting, by the resource allocation device for the VDU based on the configuration condition, a physical machine that meets the configuration condition.

In this way, when a plurality of factors need to be considered to schedule a resource for the VDU, the resource configuration information group includes filter-type resource scheduling parameters that indicate a plurality of factors, and the resource allocation device may schedule a resource for the VDU based on a plurality of factors, and select, for the VDU, a physical machine that meets configuration conditions including the filter-type resource scheduling parameters, thereby improving resource scheduling flexibility in a VNF instantiation process.

In a possible design, the selecting, by the resource allocation device for the VDU based on the configuration condition, a physical machine that meets the configuration condition in the foregoing design specifically includes:

sorting out, by the resource allocation device in a plurality of physical machines, at least one candidate physical machine that meets the configuration condition; and selecting, by the resource allocation device, one of the at least one candidate physical machine as the physical machine of the VDU.

In this way, the resource allocation device may select, for the VDU from a plurality of physical machines, a physical machine that meets the configuration condition.

In a possible design, the resource scheduling parameter includes a plurality of filter-type resource scheduling parameters, the resource configuration information group further includes a value range corresponding to each of the plurality of filter-type resource scheduling parameters, and each of the plurality of filter-type resource scheduling parameters and the corresponding value range constitute a filter-type configuration condition; and the plurality of filter-type resource scheduling parameters constitute a plurality of configuration conditions; and the selecting, by the resource allocation device, a physical machine for the VDU based on the resource scheduling parameter includes:

selecting, by the resource allocation device for the VDU based on some or all of the plurality of configuration conditions, a physical machine that meets the some or all of the plurality of configuration conditions.

In this way, when a plurality of factors need to be considered to schedule a resource for the VDU, the resource configuration information group includes filter-type resource scheduling parameters that indicate a plurality of factors, and the resource allocation device may schedule a resource for the VDU based on a plurality of factors, and select, for the VDU, a physical machine that meets some or all of a plurality of configuration conditions including the plurality of filter-type resource scheduling parameters, thereby improving resource scheduling flexibility in a VNF instantiation process.

In a possible design, the selecting, by the resource allocation device for the VDU based on some or all of the plurality of configuration conditions, a physical machine that meets the some or all of the plurality of configuration conditions in the foregoing design specifically includes:

sorting out, by the resource allocation device in a plurality of physical machines, at least one candidate physical machine that meets the some or all of the plurality of configuration conditions; and selecting, by the resource allocation device, one of the at least one candidate physical machine as the physical machine of the VDU.

In this way, the resource allocation device may select, for the VDU from a plurality of physical machines, a physical machine that meets some or all of the plurality of configuration conditions.

In a possible design, the resource scheduling parameter includes a plurality of weight-type resource scheduling parameters, and the plurality of weight-type resource scheduling parameters are used by the resource allocation device to determine a weight of a physical machine; and the selecting, by the resource allocation device, a physical machine for the VDU based on the resource scheduling parameter includes:

determining, by the resource allocation device, a weight of each of a plurality of physical machines based on the plurality of weight-type resource scheduling parameters; and sorting out, by the resource allocation device as the physical machine of the VDU, a physical machine with a maximum weight or a minimum weight in the plurality of physical machines.

In this way, when a plurality of factors need to be considered to schedule a resource for the VDU, the resource configuration information group includes weight-type resource scheduling parameters that indicate a plurality of factors, and the resource allocation device may determine a weight of a physical machine by using a plurality of weight-type resource scheduling parameters, so as to select a physical machine for the VDU based on the weight of the physical machine. The resource allocation device may schedule a resource for the VDU based on a plurality of factors, thereby improving resource scheduling flexibility in a VNF instantiation process.

In a possible design, the selecting, by the resource allocation device, one of the at least one candidate physical machine as the physical machine corresponding to the VDU includes:

determining, by the resource allocation device, a weight of each of the at least one candidate physical machine based on the plurality of weight-type resource scheduling parameters; and sorting out, by the resource allocation device as the physical machine of the VDU, a candidate physical machine with a maximum weight or a minimum weight in the at least one physical machine.

In this way, when a plurality of factors need to be considered to schedule a resource for the VDU, the resource configuration information group includes filter-type resource scheduling parameters and weight-type resource scheduling parameters that indicate a plurality of factors, and the resource allocation device may first select, for the VDU by using the filter-type resource scheduling parameters, at least one candidate physical machine that meets the filter-type resource scheduling parameters or a configuration condition, and then determine a weight of each physical machine by using the plurality of weight-type resource scheduling parameters, so as to select a physical machine for the VDU based on the weight of the candidate physical machine. The resource allocation device may schedule a resource for the VDU based on a plurality of factors, thereby improving resource scheduling flexibility in a VNF instantiation process.

In a possible design, the weight of the physical machine is a sum of products obtained by multiplying values of weight-type resource scheduling parameters of the physical machine by corresponding weight values.

In a possible design, the determining, by the resource allocation device, a weight of each of the plurality of physical machines based on the plurality of weight-type resource scheduling parameters includes:

obtaining, by the resource allocation device, a weight value corresponding to each weight-type resource scheduling parameter in the plurality of weight-type resource scheduling parameters;

obtaining, by the resource allocation device, a value of each weight-type resource scheduling parameter of each of the plurality of physical machines; and calculating, by the resource allocation device, a weight of each of the plurality of physical machines based on a value of each weight-type resource scheduling parameter of each of the plurality of physical machines and a corresponding weight value.

In this way, the resource allocation device may accurately determine a weight of each of a plurality of physical machines.

In a possible design, the obtaining, by the resource allocation device, a weight value corresponding to each weight-type resource scheduling parameter in the plurality of weight-type resource scheduling parameters includes:

obtaining, by the resource allocation device, the weight value corresponding to each weight-type resource scheduling parameter included in the resource configuration information group; or obtaining, by the resource allocation device, the stored weight value corresponding to each weight-type resource scheduling parameter.

In a possible design, the obtaining, by the resource allocation device, the resource configuration information group includes:

obtaining, by the resource allocation device, the resource configuration information group included in the resource allocation request; or obtaining, by the resource allocation device, the stored resource configuration information group.

In a possible design, the resource allocation device includes a virtualized infrastructure manager.

According to a third aspect, an embodiment of the present invention provides an NFV control device, and the NFV control device has a function of implementing NFV control device behavior in the method example. The function may be implemented by using hardware, or may be implemented by hardware executing corresponding software. The hardware or the software includes one or more modules corresponding to the function.

In a possible design, the NFV control device includes a receiving unit, a processing unit, and a sending unit. The processing unit is configured to support the NFV control device in performing a corresponding function in the foregoing method, the receiving unit is configured to support the NFV control device in receiving information from another device, and the sending unit is configured to support the NFV control device in sending information to another device. The NFV control device may further include a storage unit. The storage unit is configured to be coupled to the processing unit, and the storage unit stores a program instruction and data that are necessary for the NFV control device. For example, the processing unit may be a processor, the sending unit and the receiving unit may be a communications interface, and the storage unit may be a storage.

According to a fourth aspect, an embodiment of the present invention provides a resource allocation device. The resource allocation device has a function of implementing resource allocation device behavior in the foregoing method example. The function may be implemented by using hardware, or may be implemented by hardware executing corresponding software. The hardware or the software includes one or more modules corresponding to the function.

In a possible design, the resource allocation device includes a receiving unit and a processing unit. The processing unit is configured to support the resource allocation device in executing a corresponding function in the foregoing method, and the receiving unit is configured to support the resource allocation device in receiving information from another device (for example, an NFV control device). The resource allocation device may further include a storage unit. The storage unit is configured to be coupled to the processing unit, and the storage unit stores a program instruction and data that are necessary for the resource allocation device. For example, the processing unit may be a processor, the sending unit may be a communications interface, and the storage unit may be a storage.

According to a fifth aspect, an embodiment of the present invention provides a resource allocation system for a VNF. The system includes the NFV control device in the foregoing aspects and the resource allocation device in the foregoing aspects.

According to a sixth aspect, an embodiment of the present invention provides a computer storage medium, configured to store a computer software instruction used by the foregoing NFV control device. The computer storage medium includes a program designed for implementing the foregoing aspect.

According to a seventh aspect, an embodiment of the present invention further provides another computer storage medium, configured to store a computer software instruction used by the foregoing resource allocation device. The computer storage medium includes a program designed for implementing the foregoing aspect.

In the embodiments of the present invention, after receiving the VNF instantiation request, the NFV control device generates the resource allocation request for the VDU included in the VNF, and sends the resource allocation request to the resource allocation device. After receiving the resource allocation request, the resource allocation device determines the resource configuration information group of the VDU. The resource configuration information group includes the resource scheduling parameter, the resource scheduling parameter is used to indicate the requirement of the VNF on the resource selection and scheduling policy, and the resource allocation device selects a physical machine for the VDU based on the resource scheduling parameter. Because the resource configuration information group includes the resource scheduling parameter used to indicate the requirement of the VNF on the resource selection and scheduling policy, when a plurality of factors need to be considered to schedule a resource for the VDU, the resource configuration information group may include resource scheduling parameters that indicate a plurality of factors. In this way, the resource allocation device may schedule a resource for the VDU based on a plurality of factors, to select a physical machine for the VDU, thereby improving resource scheduling flexibility in a VNF instantiation process.

DESCRIPTION OF EMBODIMENTS

Embodiments of the present invention provide a resource allocation method for a VNF and an apparatus. The method and the apparatus are based on a same inventive concept. Because a problem resolving principle of the method is similar to that of the apparatus, mutual reference may be made to implementations of the apparatus and the method. No repeated description is provided.

Figure 1:
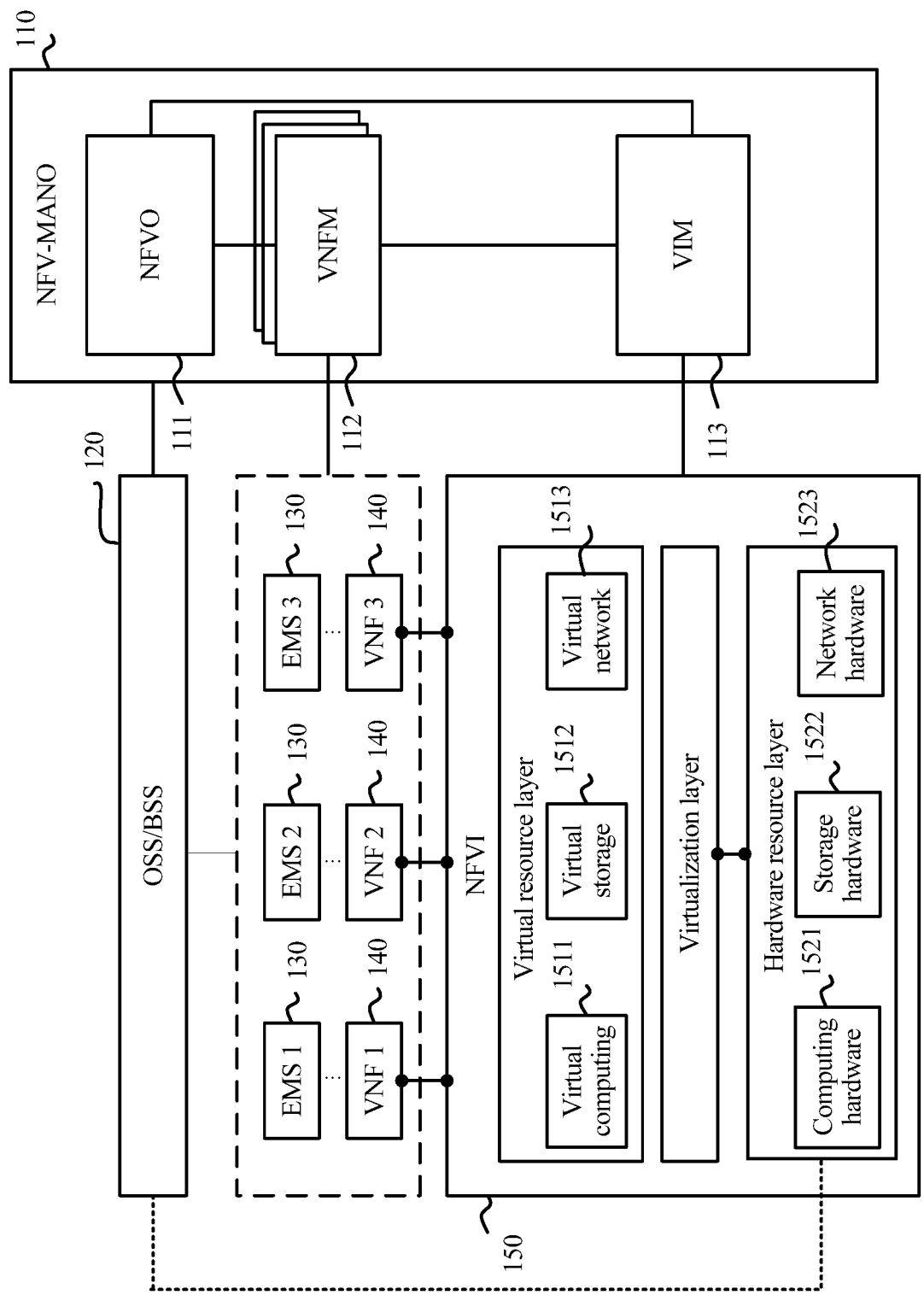
FIG. 1 is a schematic diagram of an NFV architecture according to an embodiment of the present invention.

Referring to FIG. 1, an embodiment of the present invention provides a schematic diagram of an NFV architecture. The NFV architecture may implement a plurality of types of networks, such as a local area network (LAN), an Internet Protocol IP) network, or an evolved packet core (EPC) network. As shown in FIG. 1, the NFV architecture may include an NFV Management and Orchestration system (NFV-MANO) System 110, an NFV infrastructure (NFVI) 150, a plurality of virtualized network functions (VNF) 140, a plurality of element management systems (EMS) 130, and one or more operation support systems/business support systems (OSS/BSS) 120.

The NFV-MANO 110 may include an NFV orchestrator (NFVO) 111, one or more VNF managers (VNFM) 112, and one or more virtualized infrastructure managers (VIM) 113. The NFVI 150 may include a hardware resource layer including computing hardware 1521, storage hardware 1522, and network hardware 1523, a virtualization layer, and a virtualization resource layer including virtual computing 1511 (such as a virtual machine), a virtual storage 1512, and a virtual network 1513.

The computing hardware 1521 at the hardware resource layer may be a dedicated processor or a general-purpose processor configured to provide processing and computing functions, such as a central processing unit (CPU). The storage hardware 1522 is configured to provide a storage capability, for example, a disk or a network attached storage (NAS). The network hardware 1523 may be a switch, a router, and/or another network device.

The virtualization layer in the NFVI 150 is used to abstract a hardware resource at the hardware resource layer and decouple the VNF 140 from a physical layer to which the hardware resource belongs, to provide the VNF with a virtual resource.

The virtual resource layer may include the virtual computing 1511, the virtual storage 1512, and the virtual network 1513. The virtual computing 1511 and the virtual storage 1512 may be provided to the VNF 140 in a form of a virtual machine or another virtual container. For example, one or more virtual machines may constitute one VNF 140. The virtualization layer forms the virtual network 1513 by abstracting the network hardware 1523. The virtual network 1513 is configured to implement communication between a plurality of virtual machines or between a plurality of virtual containers of another type that carry VNFs. The virtual network may be created by using a technology, such as a virtual LAN (VLAN), a virtual private local area network service (VPLS), a virtual extensible local area network (VxLAN), or network virtualization using generic routing encapsulation NVGRE).

The OSS/BSS 120 mainly targets a telecom service operator, and provides comprehensive network management and service operation functions including network management (such as fault monitoring and network information collecting), charging management, customer service management, and the like.

The NFV-MANO 110 may be configured to monitor and manage the VNF 140 and the NFVI 150. The NFVO 111 may communicate with one or more VNFMs 112, so as to implement a resource-related request, send configuration information to the VNFM 112, and collect status information of the VNF 140. In addition, the NFVO 111 may further communicate with the VIM 113, so as to implement resource allocation and/or reserve and exchange configuration information and status information of a virtualized hardware resource. The VNFM 112 may be configured to manage one or more VNFs 140 and perform various management functions, for example, initialize, update, query, and/or terminate the VNF 140. The VIM 113 may be configured to control and manage interaction between the VNF 140 and each of the computing hardware 1521, the storage hardware 1522, the network hardware 1523, the virtual computing 1511, the virtual storage 1512, and the virtual network 1513. For example, the VIM 113 may be configured to perform a resource allocation operation on the VNF 140. The VNFM 112 and the VIM 113 may communicate with each other to exchange the configuration and status information of the virtualized hardware resource.

The NFVI 150 includes hardware and software, and the hardware and software collectively build a virtualization environment to deploy, manage, and implement the VNF 140. In other words, the hardware resource layer and the virtual resource layer are used to provide a virtual resource to the VNF 140, such as a virtual machine and/or a virtual container in another form.

As shown in FIG. 1, the VNFM 112 may communicate with the VNF 140 and the EMS 130, so as to perform VNF lifecycle management and exchange configuration/status information. The VNF 140 is virtualization of at least one network function, and the network function is previously provided by a physical network device. In an implementation, the VNF 140 may be a virtualized mobility management entity (MME) node configured to provide all network functions provided by a typical non-virtualized MME device. In another implementation, the VNF 140 may be configured to implement functions of some of all components provided by a non-virtualized MME device. One VNF 140 may include one or more virtualized network function components (VNFC), and the VNFC may be a virtual machine or a virtual container in another form. The EMS 130 may be configured to manage one or more VNFs 140.

It may be learned, from the foregoing functional description of each constituent part in the system architecture of the NFV system, that the VNFM 112 is configured to perform various management functions on the VNF 140, for example, initializing, updating, querying, and terminating the VNF 140, and the VIM 113 is configured to control and manage interaction between the VNF 140 and another part. Therefore, to implement a VNF 140, the VNFM 112 and the VIM 113 need to cooperate. The VNFM 112 and the VIM 113 may communicate with each other to exchange configuration and status information of a virtualized hardware resource. The VNFM 112 and the VIM 113 establish a communication connection through an interface.

A conventional VNF instantiation procedure includes the following steps:

The NFVO or the VNFM in the NFV architecture shown in FIG. 1 receives a VNF instantiation request sent by the OSS/BSS or a network management entity connected to the NFVO or the VNFM.

The NFVO or the VNFM determines, based on the VNF instantiation identifier, a virtualized network function descriptor (VNFD) corresponding to a to-be-instantiated VNF, and obtains deployment information of the VNF in the VNFD, to be specific, the following several parameters: deployment_flavour, information about at least one VDU included in the VNF, virtual_link, connection_point, dependency, and affinity/anti-affinity. The VDU describes a resource requirement of a virtual machine (VM) or a virtual container.

Then the NFVO or the VNFM generates a resource allocation request for each VDU based on the foregoing parameters, and sends the resource allocation request of each VDU to the VIM. The resource allocation request of each VDU includes a characteristic of a resource applied for by the VDU.

After receiving a resource allocation request of a VDU, the VIM selects a physical machine that meets a characteristic of a resource applied for by the VDU, and allocates a resource and creating the VDU, a virtual link, and the like on the physical machine.

The following explains some terms in this disclosure to facilitate understanding of persons skilled in the art.

An NFV control device in the embodiments of the present invention is a device that receives a VNF instantiation request in a VNF instantiation process, and generates a resource allocation request for each of at least one VDU included in a to-be-instantiated VNF. The NFV control device may be the NFVO 111 or the VNFM 112 in the NFV architecture shown in FIG. 1.

A VDU in the embodiments of the present invention is a constituent unit of a VNF, and describes a resource requirement of a virtual machine or a virtual container.

A resource allocation device in the embodiments of the present invention is a device that receives a resource allocation request of a VDU included in a to-be-instantiated VNF in a VNF instantiation process, selects a physical machine for the VDU based on the resource allocation request, and allocates a resource and creates the VDU, a virtual link, and the like on the physical machine. The resource allocation device may be the VIM 113 in the NFV architecture shown in FIG. 1.

A physical machine in the embodiments of the present invention is an entity device that may carry a VDU, such as a computer or a server.

The term "and/or" describes an association relationship for describing associated objects and indicates that three relationships may exist. For example, A and/or B may represent the following three cases: Only A exists, both A and B exist, and only B exists. The character "/" usually indicates an "or" relationship between the associated objects.

In addition, it should be understood that in the description of this disclosure, the words "first", "second", and the like are merely used for distinction description, and shall not be understood as an indication or implication of relative importance or an indication or implication of an order.

Figure 2:
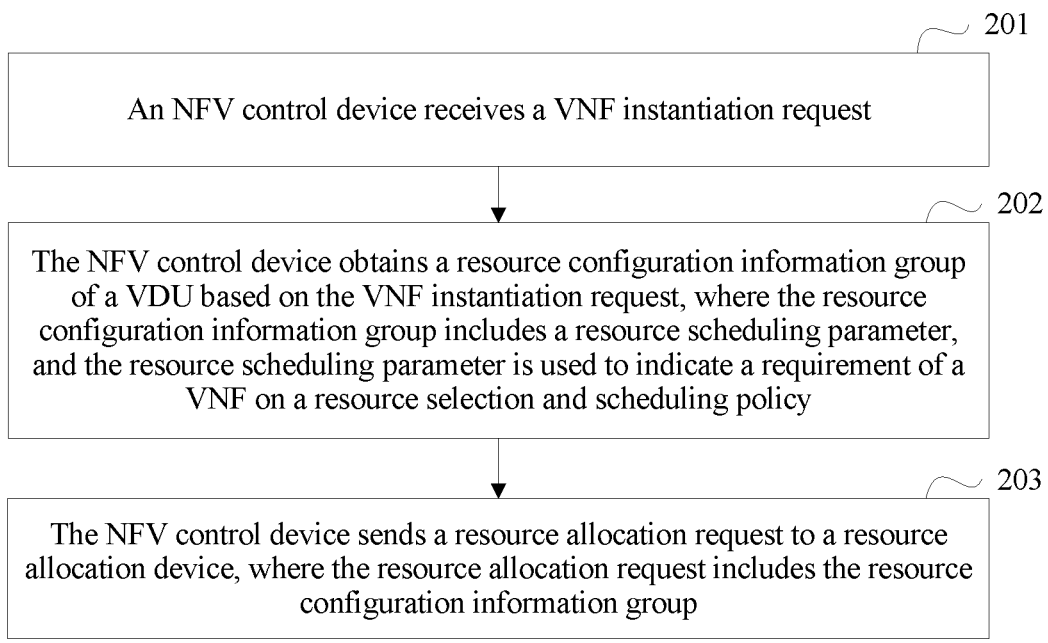
FIG. 2 is a flowchart of a resource allocation method for a VNF according to an embodiment of the present invention.

A resource allocation method for a VNF provided in the embodiments of the present invention may be used in the NFV architecture shown in FIG. 1, but no limitation is imposed thereto. The method is applied to an NFV control device in an NFV architecture, and the NFV control device may include an NFVO or a VNFM. Referring to FIG. 2, a specific procedure of the method includes the following steps.

Step 201: The NFV control device receives a VNF instantiation request.

The VNF instantiation request may be sent by an OSS/BSS in the NFV architecture or a network management entity connected to the NFV control device.

Usually, after receiving the VNF instantiation request, the NFV control device verifies correctness of the VNF instantiation request, and then performs step 202 after the verification succeeds.

Step 202: The NFV control device obtains a resource configuration information group of a VDU according to the VNF instantiation request, where the resource configuration information group includes a resource scheduling parameter, and the resource scheduling parameter is used to indicate a requirement of a VNF on a resource selection and scheduling policy.

The NFV control device performs step 202 for a VDU included in a to-be-instantiated VNF. Because the VNF includes at least one VDU, optionally, the NFV control device may perform step 202 for each of the at least one VDU.

Optionally, that the NFV control device obtains the configuration information includes:

determining, by the NFV control device, an identifier of the VNF according to the VNF instantiation request;

determining, by the NFV control device, a corresponding virtualized network function descriptor VNFD based on the identifier of the VNF; and obtaining, by the NFV control device, the configuration information included in the VNFD.

The configuration information of the VNF is preconfigured in the VNFD, and then the OSS/BSS in the NFV architecture or another network management entity uploads the VNFD by using the NFVO, so that the NFV control device can obtain the VNFD. Optionally, the VNFD further includes deployment information of the to-be-instantiated VNF, to be specific, the following several parameters: deployment_flavour, information about at least one VDU included in the VNF, virtual_link, connection_point, dependency, affinity/anti-affinity, and the like.

The parameter "deployment_flavour" specifies a deployment manner of the VNF. For example, the deployment manner is classified into three types: a large deployment manner, a medium deployment manner, and a small deployment manner. In the large deployment manner, a control and management device needs to deploy a relatively large VDU (for example, a virtual machine with a large hard disk and a large memory) or a relatively large quantity of VDUs. In the medium deployment manner, a medium VDU or a moderate quantity of VDUs need to be deployed. In the small deployment manner, a relatively small VDU or a relatively small quantity of VDUs are deployed. Because the VNF may include a plurality of VDUs, these different VDUs may be combined and applied to same "deployment_flavour", or may be used in different "deployment_flavour".

Information about each VDU specifies a size of the VDU, for example, a quantity of central processing units (CPU) of a virtual machine, CPU performance, a memory size, bandwidth, or a storage size.

The parameter "virtual_link" specifies an attribute of a virtual link between different VDUs included in the VNF and an attribute of an external virtual link of the VNF, including a link type (such as a tree type and an LAN type), link bandwidth, a quality of service (QoS) requirement (such as a delay or jitter), and the like.

The parameter "connection_point" specifies an internal port and an external connection port of the VNF. Different port types exist in different disclosure environments. For example, a port type may be a layer 2 port (using a Media Access Control (MAC) address for interaction), or may be a layer 3 port (using an Internet Protocol (IP) address for interaction). These ports are associated with "virtual_link", to completely describe a network connection status of the VNF.

The parameter "dependency" specifies a dependency relationship between virtual machines, and is used to indicate an instantiation sequence of different virtual machines in a deployment process, in other words, a virtual machine on which another virtual machine depends needs to be first instantiated. The another virtual machine may start to be instantiated only after the virtual machine on which the another virtual machine depends is started.

The parameter "affinity/anti-affinity" specifies a relationship between deployment locations of virtual machines. The parameter "affinity" indicates that virtual machines indicated by "affinity" need to be deployed on a same physical machine, and the parameter "anti-affinity" indicates that virtual machines indicated by "anti-affinity" cannot be deployed on a same physical machine.

Optionally, the resource scheduling parameter in the resource configuration information group may be used in the following several cases:

In a first case, the resource scheduling parameter in the resource configuration information group includes a filter-type resource scheduling parameter, and the filter-type resource scheduling parameter is used to select a physical machine that meets the filter-type resource scheduling parameter. For example, the resource scheduling parameter includes a filter-type resource scheduling parameter (a physical machine meets a requirement of a virtual machine image). If the resource scheduling parameter exists in a physical machine, it indicates that the physical machine meets the filter-type resource scheduling parameter.

In a second case, the resource scheduling parameter includes a filter-type resource scheduling parameter, the resource configuration information group further includes a value range corresponding to the filter-type resource scheduling parameter, and the resource scheduling parameter and the corresponding value range constitute a filter-type configuration condition. The configuration condition is used to select a physical machine that meets the configuration condition. For example, the resource scheduling parameter includes a filter-type resource scheduling parameter (CPU usage of a physical machine), and further includes a corresponding value range (less than 60%), to constitute a filter-type configuration condition (CPU usage of a physical machine is less than 60%). If CPU usage of a physical machine is 50%, it indicates that the physical machine meets the configuration condition.

In a third case, the resource scheduling parameter includes a plurality of filter-type resource scheduling parameters, the resource configuration information group further includes a value range corresponding to each of the plurality of filter-type resource scheduling parameters, and each of the plurality of filter-type resource scheduling parameters and the corresponding value range constitute a filter-type configuration condition. A plurality of configuration conditions including the plurality of filter-type resource scheduling parameters are used to select a physical machine that meets some or all of the plurality of configuration conditions. This case is similar to the second case, and details are not described herein again.

In a fourth case, the resource scheduling parameter includes a plurality of weight-type resource scheduling parameters, and the plurality of weight-type resource scheduling parameters are used to determine a weight of a physical machine. Optionally, the weight of the physical machine is a sum of products obtained by multiplying values of weight-type resource scheduling parameters of the physical machine by corresponding weight values. In this case, the resource allocation device may sort out a physical machine with a maximum weight or a minimum weight when determining weights of a plurality of physical machines.

In a fifth case, with reference to the first case and the fourth case, the resource scheduling parameter includes a filter-type resource scheduling parameter and a plurality of weight-type resource scheduling parameters. The filter-type resource scheduling parameter is used to select a physical machine that meets the filter-type resource scheduling parameter.

In a sixth case, with reference to the second case and the fourth case, the resource scheduling parameter includes a filter-type resource scheduling parameter and a plurality of weight-type resource scheduling parameters. The resource configuration information group further includes a value range corresponding to the filter-type resource scheduling parameter. The resource scheduling parameter and the corresponding value range constitute a filter-type configuration condition. The configuration condition is used to select a physical machine that meets the configuration condition.

In a seventh case, with reference to the third case and the fourth case, the resource scheduling parameter includes a plurality of filter-type resource scheduling parameters and a plurality of weight-type resource scheduling parameters. The resource configuration information group further includes a value range corresponding to each of the plurality of filter-type resource scheduling parameters. Each of the plurality of filter-type resource scheduling parameters and the corresponding value range constitute a filter-type configuration condition. A plurality of configuration conditions including the plurality of filter-type resource scheduling parameters are used to select a physical machine that meets some or all of the plurality of configuration conditions.

Optionally, the filter-type resource scheduling parameter may be but is not limited to a resource scheduling parameter shown in Table 1.

TABLE 1

| Resource scheduling parameter | |
|---|---|
| Resource scheduling parameter | Function descriptions of the resource scheduling parameter |
| AggregateCoreFilter | To determine whether CPU usage of a physical machine is less than specified maximum CPU usage in a set to which the physical machine belongs |
| AggregateDiskFilter | To determine whether hard disk usage of a physical machine is less than specified maximum hard disk usage in a set to which the physical machine belongs |
| AggregateImagePropertiesIsolation | To determine whether a set to which a physical machine belongs matches a virtual machine image attribute |
| AggregateIoOpsFilter | To determine whether a quantity of input/output (Input/Output, I/O) operations of a physical machine is less than a specified maximum quantity of I/O operations of a set to which the physical machine belongs |
| AggregateMultiTenancyIsolation | To determine whether a physical machine supports an operation of a specific tenant |
| AggregateNumInstancesFilter | To determine whether a quantity of virtual machines on a physical machine is less than a specified maximum quantity of virtual machines in a set to which the physical machine belongs |
| AggregateRamFilter | To determine whether memory usage of a physical machine is less than specified maximum memory usage in a set to which the physical machine belongs |
| AggregateTypeAffinityFilter | To determine whether a set to which a physical machine belongs matches a virtual machine type |
| AvailabilityZoneFilter | To determine whether a physical machine belongs to a specific availability zone |
| ComputeCapabilitiesFilter | To determine whether a physical machine has a specified capability |
| ComputeFilter | To determine whether a physical machine normally runs |
| CoreFilter | To determine whether a CPU of a physical machine meets a requirement (or whether usage of the CPU is less than specified usage) |
| NUMATopologyFilter | To determine whether a physical machine meets a NUMA requirement |
| DifferentHostFilter | To exclude a known physical machine hosting several virtual machines |
| DiskFilter | To determine whether a hard disk of a physical machine meets a requirement (or whether usage of the hard disk is less than specified usage) |
| GroupAffinityFilter | To select a physical machine in an affinity group |
| GroupAntiAffinityFilter | To ensure that virtual machines in a group run on different physical machines |
| ImagePropertiesFilter | To determine whether a physical machine meets a requirement of a virtual machine image |

TABLE 1-continued

| Resource scheduling parameter | Function descriptions of the resource scheduling parameter |
|---|---|
| IsolatedHostsFilter | To ensure that a virtual machine created by using a specific virtual machine image can run only on a specific physical machine |
| IoOpsFilter | To determine whether a quantity of I/O operations of a physical machine is less than a specified value |
| JsonFilter | To make a decision by using a self-defined filter-type resource scheduling parameter in a JSON format |
| MetricsFilter | To determine whether a physical machine supports a specific measurement counter |
| NumInstancesFilter | To determine whether a quantity of virtual machines on a physical machine is less than a specified value |
| PciPassthroughFilter | To determine whether a physical machine includes a hardware device that supports PCI Passthrough |
| RamFilter | To determine whether a memory of a physical machine meets a requirement (or whether usage of the memory is less than specified usage) |
| RetryFilter | To filter out a physical machine that has returned several request failures |
| SameHostFilter | To ensure that a virtual machine runs on a same physical machine as a specific known virtual machine |
| SimpleCIDRAffinityFilter | To make a selection based on an IP subnet address |
| TrustedFilter | To make a selection based on a trusted condition |
| TypeAffinityFilter | To ensure that only one type of virtual machine can run on one physical machine |

Optionally, the filter-type resource scheduling parameter may be BandwidthFilter or IsolatedFilter. BandwidthFilter is used to determine whether remaining bandwidth of a physical machine meets a requirement, and IsolatedFilter is used to determine whether a VDU in a physical machine needs to exclusively occupy the physical machine. When a VDU needs to exclusively occupy a physical machine, an idle physical machine needs to be selected to carry the VDU, and an operation such as marking needs to be performed on the physical machine, to ensure that the physical machine is not selected by another virtual machine.

Optionally, when the resource configuration information group includes a plurality of filter-type resource scheduling parameters, filter-type resource scheduling parameters of a same category may be grouped together, and configuration conditions including filter-type resource scheduling parameters of a same category may be grouped together. This is more conducive to management of the filter-type resource scheduling parameter in the VDU. Subsequently, when the resource allocation device searches for a physical machine corresponding to the VDU, the resource allocation device can more accurately and quickly determine a resource scheduling parameter in each configuration condition.

Optionally, the weight-type resource scheduling parameter may be but is not limited to a resource scheduling parameter shown in Table 2.

TABLE 2

| Resource scheduling parameter | Function descriptions of the resource scheduling parameter |
|---|---|
| ram_weight_multiplier | To make a calculation based on available memory of a physical machine, where a weight may be set to a negative value when a physical machine with relatively small remaining memory needs to be selected |
| io_ops_weight_multiplier | To make a calculation based on a quantity of I/O operations of a physical machine, where a weight may be set to a negative value when a physical machine with high load needs to be selected |
| weight_multiplier | To make a calculation based on a self-defined resource scheduling parameter |
| mute_weight_multiplier | To make a calculation based on a time when a physical machine is not updated, where a corresponding weight is a negative value |
| offset_weight_multiplier | To make a calculation based on a weight of a cell (a physical machine set) |

Optionally, when the resource configuration information group includes a plurality of weight-type resource scheduling parameters, the resource configuration information group may further include a weight value corresponding to each weight-type resource scheduling parameter.

In the third or seventh case, optionally, some of the plurality of configuration conditions include an optional identifier. The optional identifier is used to indicate that, when the resource allocation device does not find a physical machine that meets n configuration conditions, the resource allocation device may remove, from the n configuration conditions, a configuration condition including the optional identifier, where n is a positive integer greater than 1.

In step 202, the resource configuration information group includes the resource scheduling parameter. When a plurality of factors need to be considered to schedule a resource for a VDU, a resource allocation information group of the VDU may include resource scheduling parameters that indicate a plurality of factors. In this way, the resource allocation device may schedule a resource for the VDU based on a plurality of factors, to select a physical machine for the VDU, thereby improving resource scheduling flexibility in a VNF instantiation process. For example, in a specific disclosure scenario, for example, when several VDUs included in a VNF need to exclusively occupy a physical machine, or VDUs need to be placed in a centralized manner, or VDUs need to be evenly deployed in consideration of a load balancing requirement, a corresponding resource scheduling parameter may be added to a resource configuration information group of each VDU included in the VNF, so that the resource allocation device may schedule, based on the foregoing factors, a resource for each VDU included in the VNF.

Step 203: The NFV control device sends a resource allocation request to a resource allocation device, where the resource allocation request includes the resource configuration information group.

After receiving the resource allocation request, the resource allocation device may select a physical machine for the VDU based on the resource configuration information group.

According to the foregoing method, after receiving the VNF instantiation request, the NFV control device in the NFV architecture obtains the resource configuration information group of the VDU, and sends, to the resource allocation device, the resource allocation request that includes the resource configuration information group. The resource configuration information group includes the resource scheduling parameter. The resource scheduling parameter is used to indicate the requirement of the VNF on the resource selection and scheduling policy. In this way, after receiving the resource allocation request of the VDU, the resource allocation device may select a physical machine for the VDU based on the resource scheduling parameter in the resource configuration information group. Therefore, when a plurality of factors need to be considered to schedule a resource for the VDU, the resource configuration information group may include resource scheduling parameters that indicate a plurality of factors, and then the resource allocation device may schedule a resource for the VDU based on the plurality of factors, to select a physical machine for the VDU, thereby improving resource scheduling flexibility in a VNF instantiation process.

Figure 3:
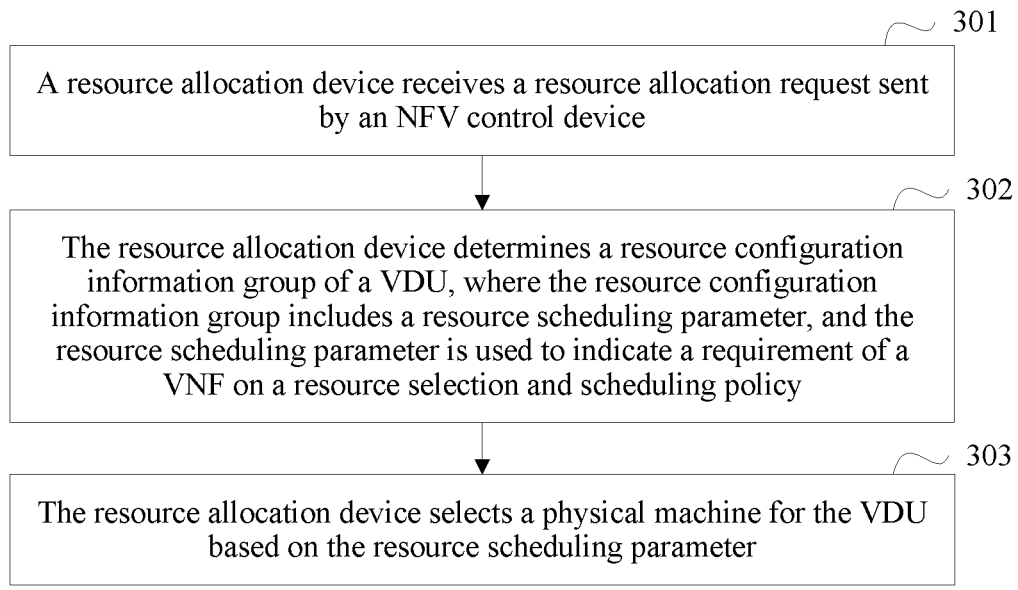
FIG. 3 is a flowchart of another resource allocation method for a VNF according to an embodiment of the present invention.

Referring to FIG. 3, an embodiment of the present invention further provides a resource allocation method for a VNF, and the method may be applicable to the NFV architecture shown in FIG. 1, but no limitation is imposed thereto. The method is applied to a resource allocation device in an NFV architecture, and the resource allocation device may include a VIM. A specific procedure of the method includes the following steps.

Step 301: The resource allocation device receives a resource allocation request sent by an NFV control device.

The resource allocation request is sent by the NFV control device for a VDU after a VNF instantiation request is received. Optionally, the resource allocation request includes a resource configuration information group.

Step 302: The resource allocation device determines a resource configuration information group of a VDU, where the resource configuration information group includes a resource scheduling parameter, and the resource scheduling parameter is used to indicate a requirement of a VNF on a resource selection and scheduling policy.

The resource allocation device determines the resource configuration information group in the following two manners:

In a first manner, when the resource allocation request includes a resource configuration information group, the resource allocation device obtains the resource configuration information group included in the resource allocation request.

In a second manner, when the resource allocation device stores a default resource configuration information group, the default resource configuration information group is applicable to any VDU or a specified VDU, and the resource allocation device obtains the stored resource configuration information group.

In the second manner, that the resource allocation device obtains the default resource configuration information group includes the following steps:

A network management entity in the NFV architecture sends a resource scheduling policy request to an NFVO (or a resource orchestrator (RO)). The resource scheduling policy request includes the resource configuration information group. The network management entity is an OSS/BSS in the NFV architecture, or another network management entity connected to the NFVO (or the RO). The RO is a virtual resource management module in the NFV architecture.

After receiving the resource scheduling policy request, the NFVO (or the RO) verifies the resource scheduling policy request, for example, performs identity authentication on the network management entity or feasibility verification on the resource scheduling policy request; and forwards the resource configuration information group in the resource scheduling policy request to the resource allocation device after the verification succeeds.

After receiving the resource configuration information group, the resource allocation device performs configuration based on the resource configuration information group; and if the configuration succeeds, saves the resource configuration information group, and feeds back, to the NFVO (or the RO), a response message indicating that the configuration succeeds; or if the configuration fails, feeds back, to the NFVO (or the RO), a response message indicating that the configuration fails. The response message indicating that the configuration fails further includes a configuration failure cause.

After receiving the response message, the NFVO (or the RO) forwards the response message to the network management entity.

Optionally, after successfully configuring the resource configuration information group, the resource allocation device may further support a query from the network management entity. Optionally, the network management entity may query the resource configuration information group, or query at least one filter-type configuration condition or at least one weight-type resource scheduling parameter in the resource configuration information group. The query procedure includes the following steps:

The network management entity to the NFVO (or the RO) initiates a request for querying a resource scheduling policy.

After receiving the request for querying a resource scheduling policy, the NFVO (or the RO) verifies the request for querying a resource scheduling policy, for example, performs identity authentication of the network management entity; and after the verification succeeds, forwards, to the resource allocation device, the request for querying a resource scheduling policy.

The resource allocation device performs query based on the request for querying a resource scheduling policy, and feeds back a query result to the network management entity by using the NFVO (or the RO). Optionally, the resource allocation device may further generate a query log that includes the query result, and saving the query log to the resource allocation device.

By using the foregoing method, the network management entity may configure and query a resource scheduling policy (resource configuration information group) in the resource allocation device by using the NFVO (or the RO), to manage the resource scheduling policy in the resource allocation device.

Optionally, the content included in the resource scheduling parameter in the resource configuration information group in step 302 is the same as the content included in the resource scheduling parameter in the resource configuration information group in step 202 in the foregoing embodiment, and may also be classified into seven cases. For details, refer to descriptions in the foregoing embodiment. Details are not described herein again.

Based on the descriptions of the resource configuration information group in the foregoing embodiment, optionally, a filter-type resource scheduling parameter in the resource configuration information group may be but is not limited to the resource scheduling parameter shown in Table 1, or may be BandwidthFilter or IsolatedFilter. Optionally, a weight-type scheduling parameter in the resource configuration information group may be but is not limited to the resource scheduling parameter shown in Table 2.

Step 303: The resource allocation device selects a physical machine for the VDU based on the resource scheduling parameter.

In a first case, the resource scheduling parameter includes a filter-type resource scheduling parameter.

When the resource allocation device performs step 303, the method includes:

selecting, by the resource allocation device for the VDU based on the filter-type resource scheduling parameter, a physical machine that meets the filter-type resource scheduling parameter. The method specifically includes:

sorting out, by the resource allocation device in a plurality of physical machines, at least one candidate physical machine that meets the filter-type resource scheduling parameter; and selecting, by the resource allocation device, one of the at least one candidate physical machine as the physical machine of the VDU.

In a second case, the resource scheduling parameter includes a filter-type resource scheduling parameter, the resource configuration information group further includes a value range corresponding to the filter-type resource scheduling parameter, and the resource scheduling parameter and the corresponding value range constitute a filter-type configuration condition.

When the resource allocation device performs step 303, the method includes:

selecting, by the resource allocation device for the VDU based on the configuration condition, a physical machine that meets the configuration condition. The method specifically includes:

sorting out, by the resource allocation device in a plurality of physical machines, at least one candidate physical machine that meets the configuration condition; and selecting, by the resource allocation device, one of the at least one candidate physical machine as the physical machine of the VDU.

In a third case, the resource scheduling parameter includes a plurality of filter-type resource scheduling parameters, the resource configuration information group further includes a value range corresponding to each of the plurality of filter-type resource scheduling parameters, and each of the plurality of filter-type resource scheduling parameters and the corresponding value range constitute a filter-type configuration condition; and the plurality of filter-type resource scheduling parameters constitute a plurality of configuration conditions.

When the resource allocation device performs step 303, the method includes:

selecting, by the resource allocation device for the VDU based on some or all of the plurality of configuration conditions, a physical machine that meets the some or all of the plurality of configuration conditions. The method specifically includes:

sorting out, by the resource allocation device in a plurality of physical machines, at least one candidate physical machine that meets the some or all of the plurality of configuration conditions; and selecting, by the resource allocation device, one of the at least one candidate physical machine as the physical machine of the VDU.

Optionally, in the first case to the third case, the resource allocation device randomly selects any one of the at least one candidate physical machine as the physical machine of the VDU.

In a fourth case, the resource scheduling parameter includes a plurality of weight-type resource scheduling parameters, and the plurality of weight-type resource scheduling parameters are used by the resource allocation device to determine a weight of a physical machine. The weight of the physical machine is a sum of products obtained by multiplying values of weight-type resource scheduling parameters of the physical machine by corresponding weight values.

When the resource allocation device performs step 303, the method includes:

determining, by the resource allocation device, a weight of each of a plurality of physical machines based on the plurality of weight-type resource scheduling parameters; and sorting out, by the resource allocation device as the physical machine of the VDU, a physical machine with a maximum weight or a minimum weight in the plurality of physical machines.

In a fifth case to a seventh case, the resource allocation device first determines at least one candidate physical machine according to the foregoing method, and in a subsequent step, the selecting, by the resource allocation device, one of the at least one candidate physical machine as the physical machine corresponding to the VDU includes:

determining, by the resource allocation device, a weight of each of the at least one candidate physical machine based on the plurality of weight-type resource scheduling parameters; and sorting out, by the resource allocation device as the physical machine of the VDU, a candidate physical machine with a maximum weight or a minimum weight in the at least one physical machine.

The determining, by the resource allocation device, a weight of each of the plurality of physical machines based on the plurality of weight-type resource scheduling parameters includes:

obtaining, by the resource allocation device, a weight value corresponding to each weight-type resource scheduling parameter in the plurality of weight-type resource scheduling parameters;

obtaining, by the resource allocation device, a value of each weight-type resource scheduling parameter of each of the plurality of physical machines; and calculating, by the resource allocation device, a weight of each of the plurality of physical machines based on a value of each weight-type resource scheduling parameter of each of the plurality of physical machines and a corresponding weight value.

Optionally, the obtaining, by the resource allocation device, a weight value corresponding to each weight-type resource scheduling parameter in the plurality of weight-type resource scheduling parameters includes:

obtaining, by the resource allocation device, the weight value corresponding to each weight-type resource scheduling parameter included in the resource configuration information group; or obtaining, by the resource allocation device, the stored weight value corresponding to each weight-type resource scheduling parameter.

Based on descriptions of the plurality of configuration conditions including the plurality of filter-type resource scheduling parameters in the foregoing embodiment, optionally, in the third case or the seventh case, some of the plurality of configuration conditions include an optional identifier.

In the third case or the seventh case, if a configuration condition including an optional identifier does not exist in the plurality of configuration conditions, when sorting out a candidate physical machine, the resource allocation device needs to sort out, in a plurality of physical machines, at least one candidate physical machine that meets all of the plurality of configuration conditions.

If a configuration condition including an optional identifier exists in the plurality of configuration conditions, when the resource allocation device sorts out a candidate physical machine, the method specifically includes the following steps:

The resource allocation device determines whether at least one first candidate physical machine that meets all of the plurality of configuration conditions exists in a plurality of physical machines.

If the at least one first candidate physical machine exists, the sorting ends.

If the at least one first candidate physical machine does not exist, the resource allocation device determines whether at least one second candidate physical machine exists in the plurality of physical machines, and the at least one second candidate physical machine meets configuration conditions in the plurality of configuration conditions except any one configuration condition including an optional identifier. If the at least one second candidate physical machine exists, the sorting ends. If the at least one second to-be selected physical machine does not exist, the resource allocation device continues to determine whether at least one third candidate physical machine exists in the plurality of physical machines, and the at least one third candidate physical machine meets configuration conditions in the at least one configuration condition except any two configuration conditions including an optional identifier. The sorting ends when the resource allocation device determines to select at least one fourth candidate physical machine in the plurality of physical machines, and the at least one fourth candidate physical machine meets configuration conditions in the at least one configuration condition except all configuration conditions including an optional identifier.

A configuration condition including an optional identifier is set in the plurality of configuration conditions, so that when a physical machine that meets the plurality of configuration conditions does not exist, the resource allocation device may lower a sorting standard, to be specific, remove a configuration condition including an optional identifier from the plurality of configuration conditions, thereby reducing a probability that the resource allocation device cannot sort out a candidate physical machine.

Optionally, when a configuration condition including an optional identifier exists in the plurality of configuration conditions, the configuration condition including an optional identifier further includes a priority. Therefore, when excluding the configuration condition including an optional identifier in a process of sorting out a candidate physical machine, the resource allocation device may exclude one configuration condition with a currently lowest priority at a time according to a priority sequence.

In the foregoing manner, the resource configuration information group includes the resource scheduling parameter. When a plurality of factors need to be considered to schedule a resource for the VDU, a resource allocation information group of the VDU may include resource scheduling parameters that indicate a plurality of factors. In this way, the resource allocation device may schedule a resource for the VDU based on a plurality of factors, to select a physical machine for the VDU, thereby improving resource scheduling flexibility in a VNF instantiation process.

According to the resource allocation method for a VNF provided in this embodiment of the present invention, after receiving the resource allocation request sent by the NFV control device, the resource allocation device in the NFV architecture determines the resource configuration information group of the VDU. The resource configuration information group of the VDU includes the resource scheduling parameter, and the resource scheduling parameter is used to indicate the requirement of the VNF on the resource selection and scheduling policy. The resource allocation device selects a physical machine for the VDU based on the resource scheduling parameter. Because the resource configuration information group includes the resource scheduling parameter used to indicate the requirement of the VNF on the resource selection and scheduling policy, when a plurality of factors need to be considered to schedule a resource for the VDU, the resource configuration information group may include resource scheduling parameters that indicate a plurality of factors. In this way, the resource allocation device may schedule a resource for the VDU based on a plurality of factors, to select a physical machine for the VDU, thereby improving resource scheduling flexibility in a VNF instantiation process.

Figure 4:
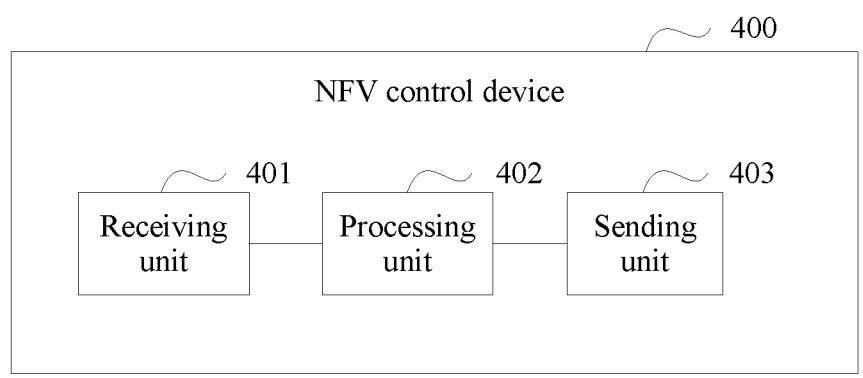
FIG. 4 is a schematic structural diagram of an NFV control device according to an embodiment of the present invention.

Based on the foregoing embodiments, an embodiment of the present invention further provides an NFV control device. The NFV control device is configured to implement the resource allocation method for a VNF shown in FIG. 2. The NFV control device may include an NFVO or a VNFM. Referring to FIG. 4, the NFV control device 400 includes a receiving unit 401, a processing unit 402, and a sending unit 403.

The receiving unit 401 is configured to receive a VNF instantiation request.

The processing unit 402 is configured to obtain a resource configuration information group of a virtualization deployment unit VDU according to the VNF instantiation request, where the resource configuration information group includes a resource scheduling parameter, and the resource scheduling parameter is used to indicate a requirement of a VNF on a resource selection and scheduling policy.

The sending unit 403 is configured to send a resource allocation request to a resource allocation device, where the resource allocation request includes the resource configuration information group.

Optionally, the resource scheduling parameter includes a filter-type resource scheduling parameter, and the filter-type resource scheduling parameter is used to select a physical machine that meets the filter-type resource scheduling parameter.

Optionally, the resource scheduling parameter includes a filter-type resource scheduling parameter, the resource configuration information group further includes a value range corresponding to the filter-type resource scheduling parameter, and the resource scheduling parameter and the corresponding value range constitute a filter-type configuration condition.

The configuration condition is used to select a physical machine that meets the configuration condition.

Optionally, the resource scheduling parameter includes a plurality of filter-type resource scheduling parameters, the resource configuration information group further includes a value range corresponding to each of the plurality of filter-type resource scheduling parameters, and each of the plurality of filter-type resource scheduling parameters and the corresponding value range constitute a filter-type configuration condition.

A plurality of configuration conditions including the plurality of filter-type resource scheduling parameters are used to select a physical machine that meets some or all of the plurality of configuration conditions.

Optionally, the resource scheduling parameter includes a plurality of weight-type resource scheduling parameters, and the plurality of weight-type resource scheduling parameters are used to determine a weight of a physical machine.

Optionally, the weight of the physical machine is a sum of products obtained by multiplying values of weight-type resource scheduling parameters of the physical machine by corresponding weight values.

Optionally, the processing unit 402 is specifically configured to:

determine an identifier of the VNF according to the VNF instantiation request;

determine a corresponding virtualized network function descriptor VNFD based on the identifier of the VNF; and obtain the resource configuration information group included in the VNFD.

After receiving the VNF instantiation request, the NFV control device provided in this embodiment of the present invention obtains the resource configuration information group of the VDU, and sends, to the resource allocation device, the resource allocation request that includes the resource configuration information group. The resource configuration information group includes the resource scheduling parameter. The resource scheduling parameter is used to indicate the requirement of the VNF on the resource selection and scheduling policy. In this way, after receiving the resource allocation request of the VDU, the resource allocation device may select a physical machine for the VDU based on the resource scheduling parameter in the resource configuration information group. Therefore, when a plurality of factors need to be considered to schedule a resource for the VDU, the resource configuration information group may include resource scheduling parameters that indicate a plurality of factors, and then the resource allocation device may schedule a resource for the VDU based on the plurality of factors, to select a physical machine for the VDU, thereby improving resource scheduling flexibility in a VNF instantiation process.

Figure 5:
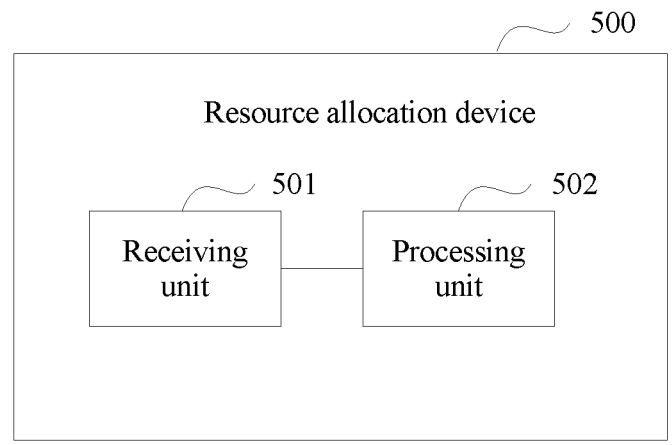
FIG. 5 is a schematic structural diagram of a resource allocation device according to an embodiment of the present invention.

An embodiment of the present invention further provides a resource allocation device. The resource allocation device is configured to implement the resource allocation method for a VNF shown in FIG. 3, and the resource allocation device may include a VIM. Referring to FIG. 5, the resource allocation device 500 includes a receiving unit 501 and a processing unit 502.

The receiving unit 501 is configured to receive a resource allocation request sent by a network functions virtualization NFV control device.

The processing unit 502 is configured to: determine a resource configuration information group of a virtualization deployment unit VDU, where the resource configuration information group includes a resource scheduling parameter, and the resource scheduling parameter is used to indicate a requirement of a VNF on a resource selection and scheduling policy; and select a physical machine for the VDU based on the resource scheduling parameter.

Optionally, the resource scheduling parameter includes a filter-type resource scheduling parameter.

When selecting a physical machine for the VDU, the processing unit 502 is specifically configured to:

select, for the VDU based on the filter-type resource scheduling parameter, a physical machine that meets the filter-type resource scheduling parameter.

Optionally, the resource scheduling parameter includes a filter-type resource scheduling parameter, the resource configuration information group further includes a value range corresponding to the filter-type resource scheduling parameter, and the resource scheduling parameter and the corresponding value range constitute a filter-type configuration condition.

When selecting a physical machine for the VDU, the processing unit 502 is specifically configured to:

select, for the VDU based on the configuration condition, a physical machine that meets the configuration condition.

Optionally, the resource scheduling parameter includes a plurality of filter-type resource scheduling parameters, the resource configuration information group further includes a value range corresponding to each of the plurality of filter-type resource scheduling parameters, and each of the plurality of filter-type resource scheduling parameters and the corresponding value range constitute a filter-type configuration condition; and the plurality of filter-type resource scheduling parameters constitute a plurality of configuration conditions.

When selecting a physical machine for the VDU, the processing unit 502 is specifically configured to:

select, for the VDU based on some or all of the plurality of configuration conditions, a physical machine that meets the some or all of the plurality of configuration conditions.

Optionally, the resource scheduling parameter includes a plurality of weight-type resource scheduling parameters, and the plurality of weight-type resource scheduling parameters are used by the resource allocation device to determine a weight of a physical machine.

Optionally, the weight of the physical machine is a sum of products obtained by multiplying values of weight-type resource scheduling parameters of the physical machine by corresponding weight values.

Optionally, when determining the resource configuration information group, the processing unit 502 is specifically configured to:

obtain the resource configuration information group included in the resource allocation request; or obtain the stored resource configuration information group.

After receiving the resource allocation request sent by the NFV control device, the resource allocation device provided in this embodiment of the present invention determines the resource configuration information group of the VDU. The resource configuration information group of the VDU includes the resource scheduling parameter, and the resource scheduling parameter is used to indicate the requirement of the VNF on the resource selection and scheduling policy. The resource allocation device selects a physical machine for the VDU based on the resource scheduling parameter. Because the resource configuration information group includes the resource scheduling parameter used to indicate the requirement of the VNF on the resource selection and scheduling policy, when a plurality of factors need to be considered to schedule a resource for the VDU, the resource configuration information group may include resource scheduling parameters that indicate a plurality of factors. In this way, the resource allocation device may schedule a resource for the VDU based on a plurality of factors, to select a physical machine for the VDU, thereby improving resource scheduling flexibility in a VNF instantiation process.

It should be noted that unit division in the embodiments of the present invention is merely an example, is merely logical function division, and may be other division in actual implementation. Functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this disclosure. The foregoing storage medium includes any medium that can store program code, such as a USB flash drive, a removable hard disk, a read-only memory (ROM), a random access memory (RAM), a magnetic disk, or an optical disc.

Figure 6:
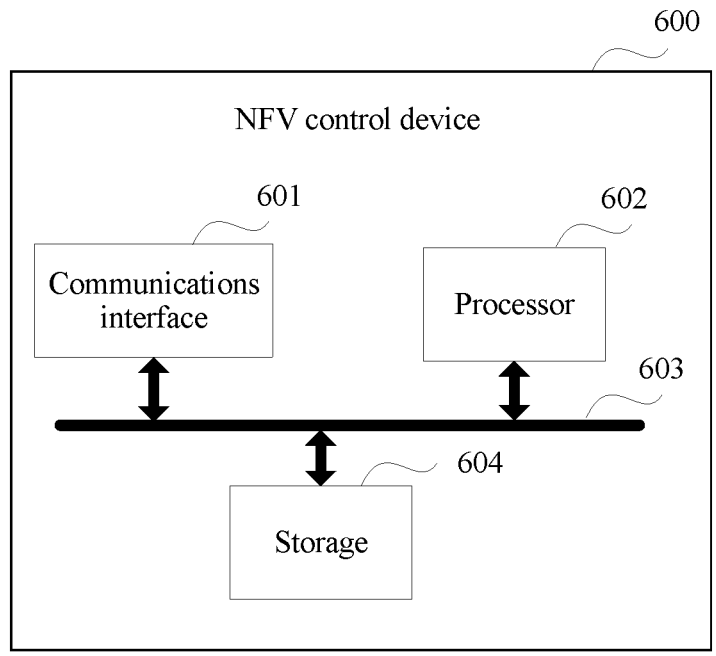
FIG. 6 is a structural diagram of an NFV control device according to an embodiment of the present invention.

Based on the foregoing embodiments, an embodiment of the present invention further provides an NFV control device, the NFV control device is configured to implement the resource allocation method for a VNF shown in FIG. 2, and the NFV control device may include an NFVO or a VNFM. Referring to FIG. 6, the NFV control device 600 includes a communications interface 601, a processor 602, a bus 603, and a storage 604.

The communications interface 601, the processor 602, and the storage 604 are interconnected by using the bus 603. The bus 603 may be a peripheral component interconnect (PCI) bus, an extended industry standard architecture (EISA) bus, or the like. The bus may be classified into an address bus, a data bus, a control bus, and the like. For convenience of denotation, the bus is represented by using only one thick line in FIG. 6. However, it does not indicate that there is only one bus or only one type of buses.

The communications interface 601 is configured to communicate and interact with a device connected to the NFV control device 600, for example, receive a VNF instantiation request, and send a resource allocation request to a resource allocation device.

The processor 602 is configured to implement the resource allocation method for a VNF shown in FIG. 2, and specifically:

receive a VNF instantiation request;

obtain a resource configuration information group of a VDU according to the VNF instantiation request, where the resource configuration information group includes a resource scheduling parameter, and the resource scheduling parameter is used to indicate a requirement of a VNF on a resource selection and scheduling policy; and send a resource allocation request to the resource allocation device, where the resource allocation request includes the resource configuration information group.

Optionally, the resource scheduling parameter includes a filter-type resource scheduling parameter, and the filter-type resource scheduling parameter is used to select a physical machine that meets the filter-type resource scheduling parameter.

Optionally, the resource scheduling parameter includes a filter-type resource scheduling parameter, the resource configuration information group further includes a value range corresponding to the filter-type resource scheduling parameter, and the resource scheduling parameter and the corresponding value range constitute a filter-type configuration condition.

The configuration condition is used to select a physical machine that meets the configuration condition.

Optionally, the resource scheduling parameter includes a plurality of filter-type resource scheduling parameters, the resource configuration information group further includes a value range corresponding to each of the plurality of filter-type resource scheduling parameters, and each of the plurality of filter-type resource scheduling parameters and the corresponding value range constitute a filter-type configuration condition.

A plurality of configuration conditions including the plurality of filter-type resource scheduling parameters are used to select a physical machine that meets some or all of the plurality of configuration conditions.

Optionally, the resource scheduling parameter includes a plurality of weight-type resource scheduling parameters, and the plurality of weight-type resource scheduling parameters are used to determine a weight of a physical machine.

Optionally, the weight of the physical machine is a sum of products obtained by multiplying values of weight-type resource scheduling parameters of the physical machine by corresponding weight values.

Optionally, when obtaining the resource configuration information group, the processor 602 is specifically configured to:

determine an identifier of the VNF according to the VNF instantiation request;

determine a corresponding virtualized network function descriptor VNFD based on the identifier of the VNF; and obtain the resource configuration information group included in the VNFD.

The NFV control device 600 may further include the storage 604 that is configured to store a program and the like. Specifically, the program may include program code, and the program code includes a computer operation instruction. The storage 604 may include a random access memory (RAM), and may further include a non-volatile memory, such as at least one magnetic disk memory. The processor 602 executes an application program stored in the storage 604, to implement the foregoing functions, to implement the resource allocation method for a VNF shown in FIG. 2.

After receiving the VNF instantiation request, the NFV control device provided in this embodiment of the present invention obtains the resource configuration information group of the VDU, and sends, to the resource allocation device, the resource allocation request that includes the resource configuration information group. The resource configuration information group includes the resource scheduling parameter. The resource scheduling parameter is used to indicate the requirement of the VNF on the resource selection and scheduling policy. In this way, after receiving the resource allocation request of the VDU, the resource allocation device may select a physical machine for the VDU based on the resource scheduling parameter in the resource configuration information group. Therefore, when a plurality of factors need to be considered to schedule a resource for the VDU, the resource configuration information group may include resource scheduling parameters that indicate a plurality of factors, and then the resource allocation device may schedule a resource for the VDU based on the plurality of factors, to select a physical machine for the VDU, thereby improving resource scheduling flexibility in a VNF instantiation process.

Figure 7:
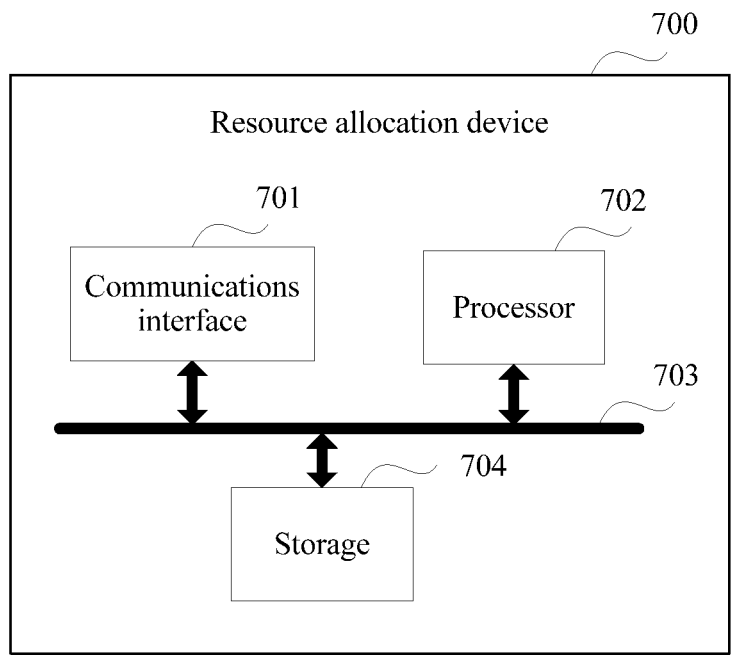
FIG. 7 is a structural diagram of a resource allocation device according to an embodiment of the present invention.

Based on the foregoing embodiments, an embodiment of the present invention further provides a resource allocation device. The resource allocation device is configured to implement the resource allocation method for a VNF shown in FIG. 3, and the resource allocation device may include a VIM. Referring to FIG. 7, the resource allocation device 700 includes a communications interface 701, a processor 702, a bus 703, and a storage 704.

The communications interface 701, the processor 702, and the storage 704 are interconnected by using the bus 703. The bus 703 may be a peripheral component interconnect (PCI) bus, an extended industry standard architecture (EISA) bus, or the like. The bus may be classified into an address bus, a data bus, a control bus, and the like. For convenience of denotation, the bus is represented by using only one thick line in FIG. 7. However, it does not indicate that there is only one bus or only one type of buses.

The communications interface 701 is configured to communicate and interact with a device connected to the resource allocation device 700, for example, receive a resource allocation request sent by NFV.

The processor 702 is configured to implement the resource allocation method for a VNF shown in FIG. 3, and specifically:

receive a resource allocation request sent by an NFV control device;

determine a resource configuration information group of a VDU, where the resource configuration information group includes a resource scheduling parameter, and the resource scheduling parameter is used to indicate a requirement of a VNF on a resource selection and scheduling policy; and select a physical machine for the VDU based on the resource scheduling parameter.

Optionally, the resource scheduling parameter includes a filter-type resource scheduling parameter.

That the processor 702 selects a physical machine for the VDU based on the resource scheduling parameter includes:

selecting, for the VDU based on the filter-type resource scheduling parameter, a physical machine that meets the filter-type resource scheduling parameter.

Optionally, the resource scheduling parameter includes a filter-type resource scheduling parameter, the resource configuration information group further includes a value range corresponding to the filter-type resource scheduling parameter, and the resource scheduling parameter and the corresponding value range constitute a filter-type configuration condition.

That the processor 702 selects a physical machine for the VDU based on the resource scheduling parameter includes:

selecting, for the VDU based on the configuration condition, a physical machine that meets the configuration condition.

Optionally, the resource scheduling parameter includes a plurality of filter-type resource scheduling parameters, the resource configuration information group further includes a value range corresponding to each of the plurality of filter-type resource scheduling parameters, and each of the plurality of filter-type resource scheduling parameters and the corresponding value range constitute a filter-type configuration condition; and the plurality of filter-type resource scheduling parameters constitute a plurality of configuration conditions.

That the processor 702 selects a physical machine for the VDU based on the resource scheduling parameter includes:

selecting, for the VDU based on some or all of the plurality of configuration conditions, a physical machine that meets the some or all of the plurality of configuration conditions.

Optionally, the resource scheduling parameter includes a plurality of weight-type resource scheduling parameters, and the plurality of weight-type resource scheduling parameters are used by the resource allocation device to determine a weight of a physical machine.

Optionally, the weight of the physical machine is a sum of products obtained by multiplying values of weight-type resource scheduling parameters of the physical machine by corresponding weight values.

Optionally, that the processor 702 determines the resource configuration information group includes:

obtaining the resource configuration information group included in the resource allocation request; or obtaining the stored resource configuration information group.

The resource allocation device 700 may further include the storage 704 that is configured to store a program and the like. Specifically, the program may include program code, and the program code includes a computer operation instruction. The storage 704 may include a random access memory (RAM), and may further include a non-volatile memory, such as at least one magnetic disk memory. The processor 702 executes an application program stored in the storage 704, to implement the foregoing functions, to implement the resource allocation method for a VNF shown in FIG. 3.

After receiving the resource allocation request sent by the NFV control device, the resource allocation device provided in this embodiment of the present invention determines the resource configuration information group of the VDU. The resource configuration information group of the VDU includes the resource scheduling parameter, and the resource scheduling parameter is used to indicate the requirement of the VNF on the resource selection and scheduling policy. The resource allocation device selects a physical machine for the VDU based on the resource scheduling parameter. Because the resource configuration information group includes the resource scheduling parameter used to indicate the requirement of the VNF on the resource selection and scheduling policy, when a plurality of factors need to be considered to schedule a resource for the VDU, the resource configuration information group may include resource scheduling parameters that indicate a plurality of factors. In this way, the resource allocation device may schedule a resource for the VDU based on a plurality of factors, to select a physical machine for the VDU, thereby improving resource scheduling flexibility in a VNF instantiation process.

In conclusion, according to the resource allocation method for a VNF and the apparatus that are provided in the embodiments of the present invention, after receiving the VNF instantiation request, the NFV control device generates the resource allocation request for the VDU included in the VNF, and sends the resource allocation request to the resource allocation device. After receiving the resource allocation request, the resource allocation device determines the resource configuration information group of the VDU. The resource configuration information group includes the resource scheduling parameter, the resource scheduling parameter is used to indicate the requirement of the VNF on the resource selection and scheduling policy, and the resource allocation device selects a physical machine for the VDU based on the resource scheduling parameter. Because the resource configuration information group includes the resource scheduling parameter used to indicate the requirement of the VNF on the resource selection and scheduling policy, when a plurality of factors need to be considered to schedule a resource for the VDU, the resource configuration information group may include resource scheduling parameters that indicate a plurality of factors. In this way, the resource allocation device may schedule a resource for the VDU based on a plurality of factors, to select a physical machine for the VDU, thereby improving resource scheduling flexibility in a VNF instantiation process.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Although some example embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method of resource allocation for a virtualized network function (VNF), comprising:
   receiving, by a network functions virtualization (NFV) control device, a VNF instantiation request;
   obtaining, by the NFV control device, a resource configuration information group of a virtualization deployment unit (VDU) according to the VNF instantiation request, wherein
      the resource configuration information group comprises a resource scheduling parameter indicating a requirement of a VNF on a resource selection and scheduling policy, wherein
      the resource scheduling parameter comprises a plurality of filter-type resource scheduling parameters, wherein
         each of the plurality of filter-type resource scheduling parameters corresponds to a value range of the resource configuration information group,
      each of the plurality of filter-type resource scheduling parameters and the corresponding value range constitute a filter-type configuration condition, and
         the plurality of filter-type resource scheduling parameters comprise a plurality of configuration conditions for selecting a physical machine that meets some or all of the plurality of configuration conditions; and sending, by the NFV control device to a resource allocation device, a resource allocation request comprising the resource configuration information group, wherein at least one of the plurality of configuration conditions include an optional identifier, wherein the optional identifier indicates that, when the resource allocation device does not find a physical machine that meets n configuration conditions, the resource allocation device removes, from the n configuration conditions, a configuration condition including the optional identifier, where n is a positive integer greater than 1.

2. The method according to claim 1, wherein the resource scheduling parameter comprises a plurality of weight-type resource scheduling parameters, and the plurality of weight-type resource scheduling parameters are used to determine a weight of a physical machine.

3. The method according to claim 1, wherein the obtaining, by the NFV control device, the resource configuration information group comprises:

determining, by the NFV control device, an identifier of the VNF according to the VNF instantiation request;

determining, by the NFV control device, a corresponding virtualized network function descriptor (VNFD) based on the identifier of the VNF; and obtaining, by the NFV control device, the resource configuration information group comprised in the VNFD.

4. A network functions virtualization (NFV) control device, comprising:

a communications interface, configured to receive a VNF instantiation request; and a processor, configured to obtain a resource configuration information group of a virtualization deployment unit (VDU) according to the VNF instantiation request, wherein the resource configuration information group comprises a resource scheduling parameter indicating a requirement of a VNF on a resource selection and scheduling policy, wherein the resource scheduling parameter comprises a plurality of filter-type resource scheduling parameters, wherein each of the plurality of filter-type resource scheduling parameters corresponds to a value range of the resource configuration information group, each of the plurality of filter-type resource scheduling parameters and the corresponding value range constitute a filter-type configuration condition, and the plurality of filter-type resource scheduling parameters comprise a plurality of configuration conditions for selecting a physical machine that meets some or all of the plurality of configuration conditions, and wherein the communications interface is further configured to send to a resource allocation device a resource allocation request comprising the resource configuration information group, and wherein at least one of the plurality of configuration conditions include an optional identifier, wherein the optional identifier indicates that, when the resource allocation device does not find a physical machine that meets n configuration conditions, the resource allocation device removes, from the n configuration conditions, a configuration condition including the optional identifier, where n is a positive integer greater than 1.

5. The NFV control device according to claim 4, wherein the resource scheduling parameter comprises a plurality of weight-type resource scheduling parameters, and the plurality of weight-type resource scheduling parameters are used to determine a weight of a physical machine.

6. The NFV control device according to claim 4, wherein the processor is configured to:

determine an identifier of the VNF according to the VNF instantiation request;

determine a corresponding virtualized network function descriptor (VNFD) based on the identifier of the VNF; and obtain the resource configuration information group comprised in the VNFD.

7. A resource allocation device, comprising:

a communications interface, configured to receive a resource allocation request sent by a network functions virtualization (NFV) control device; and a processor, configured to: determine a resource configuration information group of a virtualization deployment unit (VDU), wherein the resource configuration information group comprises a resource scheduling parameter indicating a requirement of a VNF on a resource selection and scheduling policy, wherein the resource scheduling parameter comprises a plurality of filter-type resource scheduling parameters, wherein each of the plurality of filter-type resource scheduling parameters corresponds to a value range of the resource configuration information group, each of the plurality of filter-type resource scheduling parameters and the corresponding value range constitute a filter-type configuration condition, and the plurality of filter-type resource scheduling parameters comprise a plurality of configuration conditions for selecting a physical machine for the VDU based on the resource scheduling parameter, wherein at least one of the plurality of configuration conditions include an optional identifier, wherein the optional identifier indicates that, when the processor does not find a physical machine that meets n configuration conditions, the processor removes, from the n configuration conditions, a configuration condition including the optional identifier, where n is a positive integer greater than 1.

8. The resource allocation device according to claim 7, wherein the resource scheduling parameter comprises a plurality of weight-type resource scheduling parameters, and the plurality of weight-type resource scheduling parameters are used by the resource allocation device to determine a weight of a physical machine.

9. The resource allocation device according to claim 8, wherein the weight of the physical machine is a sum of products obtained by multiplying values of weight-type resource scheduling parameters of the physical machine by corresponding weight values.

10. The resource allocation device according to claim 7, wherein the processor is configured to:

obtain the resource configuration information group comprised in the resource allocation request when determining the resource configuration information group; or obtain the stored resource configuration information group when determining the resource configuration information group.

11. The resource allocation device according to claim 7, wherein the resource allocation device comprises a virtualized infrastructure manager.

* * * * *